United States Patent
Nakazawa et al.

(10) Patent No.: US 9,165,557 B2
(45) Date of Patent: Oct. 20, 2015

(54) VOICE RECOGNIZING APPARATUS, VOICE RECOGNIZING METHOD, AND PROGRAM FOR RECOGNIZING VOICE

(75) Inventors: Satoshi Nakazawa, Tokyo (JP); Kenji Satoh, Tokyo (JP); Takahiro Ikeda, Tokyo (JP); Yoshihiro Ikeda, legal representative, Chiba (JP); Yousuke Sakao, Tokyo (JP)

(73) Assignee: NEC Corporation, Tokyo (JP)

( * ) Notice: Subject to any disclaimer, the term of this patent is extended or adjusted under 35 U.S.C. 154(b) by 1567 days.

(21) Appl. No.: 12/087,287

(22) PCT Filed: Jan. 31, 2007

(86) PCT No.: PCT/JP2007/051579
§ 371 (c)(1),
(2), (4) Date: Jun. 30, 2008

(87) PCT Pub. No.: WO2007/091462
PCT Pub. Date: Aug. 16, 2007

(65) Prior Publication Data
US 2009/0168976 A1    Jul. 2, 2009

(30) Foreign Application Priority Data
Feb. 6, 2006 (JP) ................................ 2006-028688

(51) Int. Cl.
*H04M 1/64* (2006.01)
*G10L 15/20* (2006.01)

(52) U.S. Cl.
CPC .................................. *G10L 15/20* (2013.01)

(58) Field of Classification Search
CPC .. H04M 1/27; H04M 3/4936; H04M 2201/40
USPC ................. 379/265.12, 265.13, 88.01–88.04, 379/88.05, 88.06; 704/231, 275; 455/563
See application file for complete search history.

(56) References Cited

U.S. PATENT DOCUMENTS

| | | | | |
|---|---|---|---|---|
| 5,371,779 A | * | 12/1994 | Kobayashi | .................... 455/563 |
| 5,960,063 A | | 9/1999 | Kuriowa et al. | |
| 6,049,594 A | | 4/2000 | Furman et al. | |
| 6,408,066 B1 | * | 6/2002 | Andruska et al. | ........ 379/265.12 |
| 2003/0191639 A1 | | 10/2003 | Mazza | |

FOREIGN PATENT DOCUMENTS

| | | |
|---|---|---|
| CN | 1659624 A | 8/2005 |
| EP | 0 804 850 B1 | 8/2005 |
| GB | 2 316 575 | 2/1998 |

(Continued)

*Primary Examiner* — MD S Elahee
(74) *Attorney, Agent, or Firm* — Foley & Lardner LLP

(57) ABSTRACT

In a voice recognizing apparatus, a voice recognizing method, and a program for recognizing voice are provided to carry out voice recognition with high precision. When a call receiving unit in which a plurality of telephone numbers for receiving are assigned to respective contents of calls receives a call from a caller, a calling voice signal input device inputs a calling voice signal of the call, and a receiving telephone number input device inputs the receiving telephone number of the call. A voice correction device then carries out voice correction processing for the calling voice signal in accordance with the receiving telephone number and a voice recognizing device executes voice recognition processing for the calling voice signal in accordance with the receiving telephone number.

12 Claims, 3 Drawing Sheets

(56) References Cited

FOREIGN PATENT DOCUMENTS

| | | |
|---|---|---|
| JP | 10-063293 | 3/1998 |
| JP | 10-190842 | 7/1998 |
| JP | 10-513033 | 12/1998 |
| JP | 2000-010590 A | 1/2000 |
| JP | 2000-12503 A1 | 4/2000 |
| JP | 2000-125006 A | 4/2000 |
| JP | 2005-123869 A | 5/2005 |
| JP | 2005-208483 A | 8/2005 |
| WO | WO 97/19545 | 5/1997 |
| WO | WO 03/088211 A1 | 10/2003 |

* cited by examiner

FIG. 2

| | BACKGROUND INFORMATION OF TELEPHONE NUMBER FOR RECEIVING | ITEMS TO BE SELECTED/ADJUSTED |
|---|---|---|
| 1 | WORK CONTENT, PRODUCT, ETC. TO BE HANDLED | VOCABULARY OF RECOGNITION DICTIONARY, EXPRESSION OF WORDS, LANGUAGE MODEL |
| 2 | APPLICATION AND LEVEL OF IMPORTANCE OF CALL LOGS | SEARCH PARAMETER, LANGUAGE MODEL |
| 3 | ASSUMED REGION OF TELEPHONE CALLER | VOCABULARY OF RECOGNITION DICTIONARY, ACOUSTIC MODEL, LANGUAGE MODEL |
| 4 | ASSUMED TELEPHONE LINE/TYPE | PRE-PROCESSING OF NOISE REMOVAL ETC., ACOUSTIC MODEL |

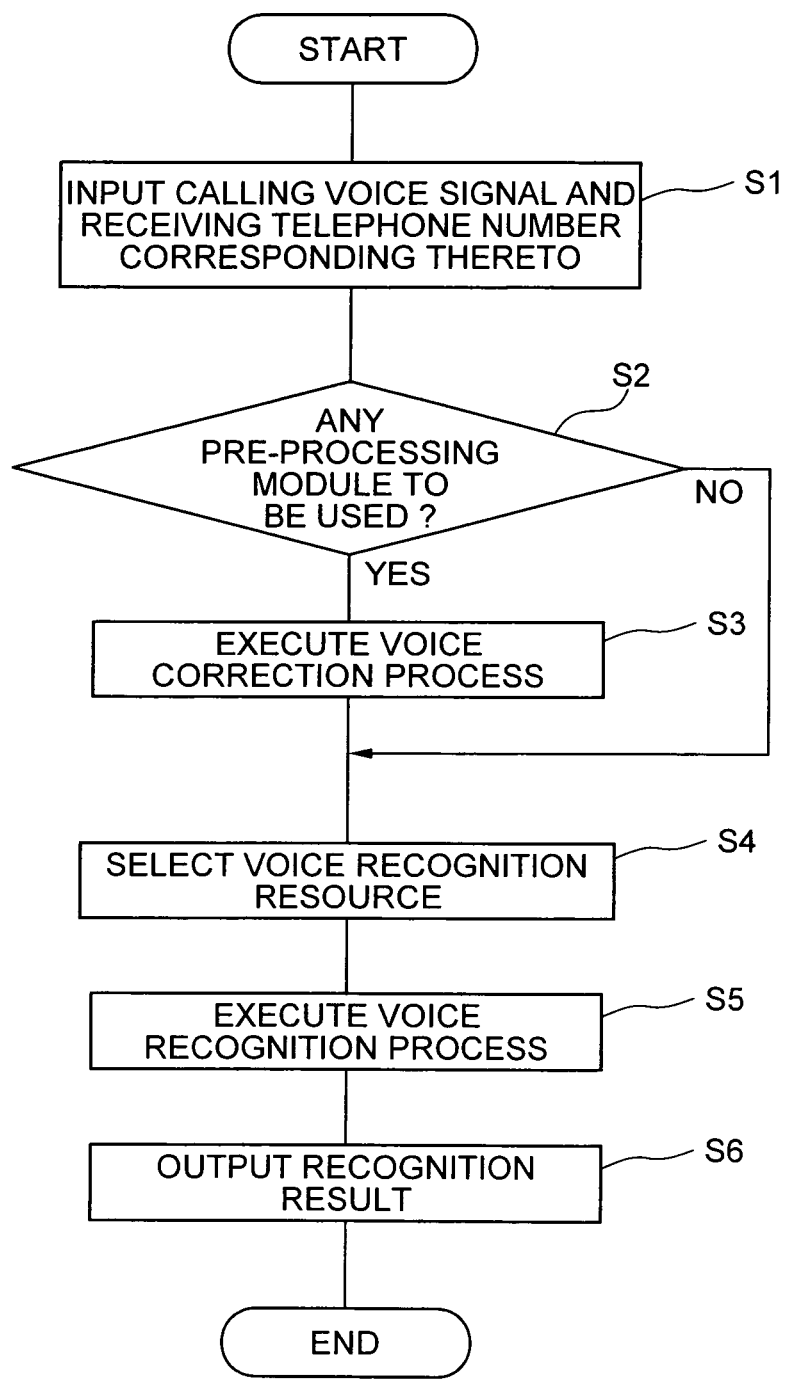

VOICE RECOGNIZING APPARATUS, VOICE RECOGNIZING METHOD, AND PROGRAM FOR RECOGNIZING VOICE

TECHNICAL FIELD/BACKGROUND OF THE INVENTION

The present invention relates to voice recognizing apparatuses, voice recognizing methods, and programs for recognizing voice, in particular, to a voice recognizing apparatus for executing a voice recognition process appropriate to the content on a calling voice of a telephone, a voice recognizing method, and a program for recognizing voice.

BACKGROUND ART

In recent years, a voice recognizing technique to be used in automatic answering and call logs of the telephone has been widely used in a call center and the like. Generally, the voice recognizing technique is a technique of extracting words registered in advance based on the voice of the telephone and automatically converting the same to character information. In this technique, an acoustic model representing the minimum recognition unit of each voice with frequency etc., a recognition dictionary defining a combination of voices as a word, and a language model showing the connecting relationship of words and expression are prepared, and voice recognition is carried out referencing the same.

In the voice recognizing technique, preparing in advance the acoustic model, the recognition dictionary, and the language model corresponding to the characteristics, types, and environments of the voice signal to be recognized is effective in reducing false recognition and enhancing the recognition accuracy. As an example of using such voice recognizing technique, patent document 1 discloses a call content write-up system where basic data to be used in voice recognition is separately prepared for a transmission side channel and a reception side channel of the telephone so that voice recognition appropriate for the respective channel is executed; and patent document 2 discloses a communication device for selecting a voice dictionary to be used in voice recognition according to the caller number of the telephone.

Patent document 1: Japanese Laid-Open Patent Publication No. 2005-123869
Patent document 2: Japanese Laid-Open Patent Publication No. 2000-125031

DISCLOSURE OF THE INVENTION

However, the system disclosed in patent document 1 merely performs voice recognition individually at the transmission side and the reception side, and it does not perform, with respect to the reception side voices which are the voices from unspecified number of callers, voice recognition appropriate for the feature thereof. Improvement in the voice recognition accuracy cannot be expected even if such system of patent document 1 is applied to automatic answering or call logs of the call center etc. since voice recognition corresponding to the voice of the customer is not performed.

In the communication device described in patent document 2, information used for predicting the content of call according to the caller number of the telephone needs to be prepared in advance, and furthermore, there is such a disadvantage that voice recognition cannot be carried out if the opponent party's telephone is set to block the caller number.

The present invention aims to provide a voice recognizing apparatus, a voice recognizing method, and a program used in the work of call center etc., for recognizing voice in which the drawbacks of the prior art are improved, where voice recognition is executed at high precision without requiring information about the caller of the call.

To achieve the above aim, a voice recognizing apparatus of the present invention includes, a call receiving unit for receiving calls placed to a plurality of telephone numbers for receiving; a calling voice signal input device for inputting a calling voice signal of the received call; a receiving telephone number input device for inputting a telephone number for receiving related to the input calling voice signal as a receiving telephone number of the call; a voice recognition information storing device for storing voice recognition information to be used for voice recognition in which the voice is recognized as language information in correspondence to the telephone number for receiving; a voice recognition information selecting device for selecting the voice recognition information corresponding to the receiving telephone number from the stored voice recognition information; and a voice recognition device for recognizing the calling voice signal input to the calling voice signal input device as language information using the selected voice recognition information, and specifying a content of voice.

According to such voice recognizing apparatus, a plurality of telephone numbers for receiving is provided according to the contents of call to be received, such as for respective contents to be handled or for respective calling regions, and the voice recognition corresponding to the receiving telephone number of the call, that is, the telephone number for receiving to which the call is placed, is executed on the voice signal of the received call, so that voice recognition of high precision corresponding to the content of the call can be executed, and the content of voice can be accurately specified.

The voice recognition information may be at least one of a recognition dictionary showing a correspondence of voice and vocabulary, an acoustic model representing acoustic features in minimum recognition unit of voice, a language model representing a connecting relationship of words, and information or recognition parameter indicating a procedure of voice recognition. In this case, the voice recognition is executed by correlating the calling voice signal with the recognition dictionary, the acoustic model, and the language model thereof.

Furthermore, a voice recognizing apparatus of the present invention includes a call receiving unit for receiving calls placed to a plurality of telephone numbers for receiving; a calling voice signal input device for inputting a calling voice signal of the received call; a receiving telephone number input device for inputting a telephone number for receiving related to the input calling voice signal as a receiving telephone number of the call; a correction content information storing device for storing correction content information indicating a content of voice signal correction in correspondence to the telephone number for receiving; a correction content information selecting device for selecting the correction content information corresponding to the receiving telephone number of the call; a voice correction device for executing a voice correction process indicated by the selected correction content information on the calling voice signal input to the calling voice signal input device; and a voice recognition device for recognizing the calling voice signal corrected by the voice correction device as language information, and specifying a content of voice.

Accordingly, the voice correction process corresponding to the content of the call can be executed on the calling voice signal. Examples of voice correction process includes noise removing process and signal distortion correction process, compressed voice correction process, and the like, where sounds not related to the voice recognition are removed from the calling voice signal by such voice correction process. Thus, the calling voice signal becomes closer to the signal of the vocal voice of the talker, i.e., the original voice signal, the voice recognition can be correctly executed, and the precision of voice recognition is enhanced.

A voice recognizing method according to the present invention includes call receiving step of receiving calls placed to a plurality of telephone numbers for receiving; calling voice signal input step of inputting a calling voice signal of the received call; receiving telephone number input step of inputting a telephone number for receiving related to the input calling voice signal as a receiving telephone number of the call; recognition information selecting step of selecting, according to the receiving telephone number of the call, voice recognition information to be used for voice recognition in which the voice is recognized as language information; and voice recognition step of recognizing the calling voice signal input in the calling voice signal input step as language information by using the selected voice recognition process information, and specifying a content of voice.

According to such voice recognizing method, a plurality of receiving telephone numbers is provided corresponding to the content of call to be received, such as for respective contents to be handled or for respective calling regions, and the voice recognition process corresponding to the receiving telephone number of the call, that is, the telephone number for receiving to which the call is placed, is executed on the voice signal of the received call, so that voice recognition of high precision corresponding to the content of the call can be executed, and the content of voice can be accurately specified.

In the voice recognizing method described above, the voice recognition information may be at least one of a recognition dictionary showing a correspondence of voice and vocabulary, an acoustic model representing acoustic features in minimum recognition unit of voice, a language model representing a connecting relationship of words, and information or recognition parameter indicating a procedure of voice recognition.

Furthermore, a voice recognizing method of the present invention includes call receiving step of receiving calls placed to a plurality of telephone numbers for receiving; calling voice signal input step of inputting a calling voice signal of the received call; receiving telephone number input step of inputting a telephone number for receiving related to the input calling voice signal as a receiving telephone number of the call; correction content information selecting step of selecting, according to the receiving telephone number of the call, correction content information indicating a content of voice signal correction from correction content information stored in advance in correspondence to the telephone number for receiving; voice correction step of executing a voice correction process indicated by the selected correction content information on the calling voice signal input in the calling voice signal input step; and voice recognition step of recognizing the voice signal corrected in the voice correction step as language information, and specifying a content of voice.

Accordingly, the voice correction process corresponding to the content of the call can be executed on the calling voice signal. Examples of voice correction process includes noise removing process and signal distortion correction process, compressed voice correction process, and the like, where sounds not related to the voice recognition are removed from the calling voice signal by such voice correction processes. Thus, the calling voice signal becomes closer to the signal of the vocal voice of the talker, i.e., the original voice signal, the voice recognition can be correctly executed, and the precision of voice recognition is enhanced.

A program for recognizing voice of the present invention causes a computer to execute call receiving process of receiving calls placed to a plurality of telephone numbers for receiving; calling voice signal input process of inputting a calling voice signal of the received call; receiving telephone number input process of inputting a telephone number for receiving related to the input calling voice signal as a receiving telephone number of the call; recognition information selecting process of selecting, according to the receiving telephone number of the call, voice recognition information to be used for recognizing voice as language information; and voice recognition process of recognizing the calling voice signal input in the calling voice signal input process as language information by using the selected voice recognition information, and specifying a content of voice.

According to such program for recognizing voice, a plurality of telephone numbers for receiving is provided corresponding to the content of call, and the voice signal of the relevant call is recognized by using the voice recognition information corresponding to the receiving telephone number of the call, that is, the telephone number for receiving to which the call is placed, so that voice recognition of high precision corresponding to the content of the call can be executed, and the content of voice can be accurately specified.

The voice recognition information may be at least one of a recognition dictionary showing a correspondence of voice and vocabulary, an acoustic model representing acoustic features in minimum recognition unit of voice, a language model representing a connecting relationship of words, and information or recognition parameter indicating a procedure of voice recognition.

Furthermore, a program for recognizing voice of the present invention causes a computer to execute call receiving process of receiving calls placed to a plurality of telephone numbers for receiving; calling voice signal input process of inputting a calling voice signal of the received call; receiving telephone number input process of inputting a telephone number for receiving related to the input calling voice signal as a receiving telephone number of the call; voice correction selecting process of selecting, according to the receiving telephone number of the call, correction content information indicating a content of voice signal correction from correction content information defined in advance for respective telephone numbers for receiving; voice correction process of correcting the calling voice signal input in the calling voice input process according to the selected correction content information; and voice recognition process of recognizing the voice signal corrected in the voice correction process as language information, and specifying a content of voice.

Accordingly, the voice correction process corresponding to the content of the call can be executed on the calling voice signal. Examples of voice correction process includes noise removing process and signal distortion correction process, compressed voice correction process, and the like, where sounds not related to the voice recognition are removed from the calling voice signal by such voice correction processes. Thus, the calling voice signal becomes closer to the signal of the vocal voice of the talker, i.e., the original voice signal, the voice recognition can be correctly executed, and the precision of voice recognition is enhanced.

The present invention is configured and functions as above, whereby the voice recognition process corresponding to the content of the call can be executed on the voice signal of the received call, and as a result, voice recognition with few false recognitions and high precision can be efficiently executed.

BEST MODE FOR CARRYING OUT THE INVENTION

One exemplary embodiment of the present invention will now be described with reference to the drawings.

FIG. 1 is a function block diagram showing an outline of a configuration of the exemplary embodiment.

A voice recognizing apparatus 1 shown in FIG. 1 is an apparatus for recognizing the calling voice from the outside, and specifying the voice content. The voice recognizing apparatus 1 is connected to a public communication network 2, and is configured by a call receiving unit 11, a calling voice signal input device 12, a receiving telephone number input device 13, a voice correction device 14, a module storing unit for pre-processing 15, a voice correction process selecting device 16, a voice recognizing device 17, a recognition dictionary, model, and parameter storing unit 18, a voice recognition process selecting device 19, and a recognition result output device 20.

The call receiving unit 11 in which a plurality of telephone numbers for receiving are assigned to receive the call placed to the respective telephone number for receiving. A private branch exchange, VOIP (Voice over IP) server, and the like are used for the call receiving unit 11.

In the general work of the call center, different telephone numbers are assigned according to the work to be handled and the calling region to respond to customers in an aim of enhancing the efficiency of answering the telephone. For the plurality of telephone numbers for receiving provided therewith according to the exemplary embodiment, the contents to be responded differ for the respective telephone numbers.

The calling voice signal input device 12 inputs the calling voice signal of the call to which voice recognition is to be performed among the calls received at the call receiving unit 11. The receiving telephone number input device 13 inputs the telephone number for receiving which is the destination of the call related to the calling voice signal input by the calling voice signal input device 12 as the receiving telephone number of the call. That is, the calling voice signal input in the calling voice signal input device 12 and the receiving telephone number input in the receiving telephone number input device 13 are being corresponded.

The calling voice signal input device 12 and the receiving telephone number input device 13 described above may have the function contents thereof programmed to be executed by a computer.

The voice correction device 14 executes voice correction processing such as noise removal on the calling voice signal input by the calling voice signal input device 12 as a pre-processing of voice recognition. It is difficult to execute voice recognition on the voice signal from the telephone line as it is, due to noise around the talker, distortion involved in coding, degradation in voice caused by voice compression of the portable telephone, and the like. Thus, the calling voice signal is corrected to enable correct voice recognition to be executed.

The voice correction process selecting device 16 selects an appropriate pre-processing module from the pre-processing modules serving as correction content information stored in the module storing unit for pre-processing 15 to correct the calling voices whose respective sound qualities are changed differently depending on the type of telephone such as portable telephone, PHS terminal, etc., calling region, and the like. The voice correction device 14 corrects the calling voice signal by using the pre-processing module selected by the voice correction process selecting device 16.

The module storing unit for pre-processing 15 serves as a correction content information storing device for storing a plurality of pre-processing modules which are prepared for respective telephone numbers for receiving according to application and purpose. The voice correction process selecting device 16 serves as a correction content information selecting device for selecting the pre-processing module according to the receiving telephone number which is input by the receiving telephone number input device 13. The pre-processing module is being used in the traditional voice processing technique, and may be module for noise removing process, module for voice signal distortion correction, module for compressed voice correction, and the like.

As a specific example of correcting the calling voice signal, there is a case in which the telephone number for receiving is a toll-free number. With the toll-free number, the type of opponent party's telephone being allowable for coming in can be designated, and thus, by preparing the pre-processing module set for respective types of telephone, such as for land telephone line and for portable telephone line in advance, and corresponding the respective pre-processing module to the telephone number such that the pre-processing module for portable telephone line is to be corresponded to the telephone number to which incoming calls from portable telephones are permitted, and the pre-processing module for satellite telephone line is to be corresponded to the telephone number to which incoming calls from satellite telephones are permitted, the pre-processing module can be selected for respective telephone number receiving the call.

Another example is a case in which the receiving telephone number is differed for overseas and domestic. As the types of the telephone line and the signal coding method differ according to countries, the pre-processing modules set for respective countries are prepared to be adapted to such situation, and each pre-processing module is made to be corresponded to the telephone number. For the calls received at the overseas telephone number, the pre-processing module set for the corresponding country is to be selected, and for the calls received at the domestic telephone number, the pre-processing module set for domestic is to be selected.

Thus, in the exemplary embodiment, since the voice characteristic of the receiving call differs for respective receiving telephone number, the pre-processing module corresponding to the characteristic is selected. Further, a common pre-processing module may be prepared to respond to a case in which the voice signal characteristics of the calls do not differ from each other among the calls corresponding to the plurality of telephone numbers for receiving. Furthermore, a plurality of pre-processing modules may be selected, and in such a case, the processing order is also defined in advance for respective receiving telephone numbers, so that the voice correction device 14 executes the process in the defined order. The voice correction device 14 may not execute pre-processing if pre-processing is unnecessary.

As described above, in the exemplary embodiment, the pre-processing module corresponding to the receiving telephone number of the call is selected from a plurality of pre-processing modules prepared for respective telephone number for receiving, and the calling voice signal is corrected by using the selected pre-processing module. With this, the voice correction device 14 execute, on the calling voice signal, the voice correction processing with the content defined for respective receiving telephone numbers.

The pre-processing module serving as the correction content information may have the contents thereof programmed, and the voice correction device 14 and the voice correction process selecting device 16 may have the function contents thereof programmed to be executed by the computer.

The voice recognizing device 17 shown in FIG. 1 executes the voice recognition process on the calling voice signal. The recognition dictionary, model, and parameter storing unit 18 serves as a voice recognition information storing device for storing a plurality of recognition dictionaries, acoustic models, language models, recognition parameters, and the like as voice recognition information prepared for receiving telephone numbers for respective according to purpose and application. The voice recognition process selecting device 19 serves as a voice recognition information selecting device for selecting the recognition dictionary, the acoustic model, the language model, the recognition parameter and the like to be used in the voice recognition process in the voice recognizing device 17 according to the receiving telephone number input by the receiving telephone number input device 13.

That is, the voice recognizing device 17 uses the recognition dictionary, the acoustic model, the language model, the recognition parameter, and the like, selected according to the receiving telephone number of the call to perform voice recognition corresponding to sound quality that differs greatly depending on the type of telephone such as portable telephone and PHS terminal, the calling region, used vocabulary that differs depending on the content to be handed and the calling region, and the like.

The recognition dictionary showing the correspondence of voice and vocabulary, the acoustic model representing the acoustic features in a minimum recognition unit of voice, the language model representing the connecting relationship of words, and the information or recognition parameter indicating the procedure of voice recognition are those used in the traditional voice recognizing technique. The recognition dictionary, the acoustic model, the language model, the recognition parameter, and the like may be hereinafter collectively referred to as voice recognition resource.

A specific example in performing the voice recognition process on the calling voice signal includes a case in which the work content, the product, and the like to be handled are being different for respective telephone numbers for receiving. In this case, the recognition dictionary and the language model are prepared for respective telephone numbers for receiving corresponding to the content of call since the words used in the call are also different for respective telephone numbers for receiving. For instance, even if the words are being the same, the word expression to be prioritized differs depending on the work, i.e., the words may be expressed in kana in one work but may be expressed in kanji in another work, or the number may be expressed in Chinese numeral in one work but may be expressed in Arabic numeral in another work, and thus the recognition dictionaries with different word expressions to be prioritized are prepared for respective telephone numbers for receiving, and the corresponding recognition dictionary is selected therefrom.

Another example is a case in which the telephone number with which the type and calling region of the telephone on the calling side can be designated such as toll-free number is being the telephone number for receiving. In this case, the appropriate voice recognition resource such as the acoustic model corresponding to the type of telephone, the recognition dictionary and the language model corresponding to the calling region, and the like is selected for respective telephone numbers for receiving.

Still another example is a case in which the levels of importance of the calls are different for respective telephone numbers for receiving. With respect to the telephone number for receiving a call on which important conversation is to be made, a recognition parameter for enhancing the authentication precision, by performing a search process in a wider range, for example, is selected, or the adjusted recognition dictionary and the language model are selected so that a specific word is not mistakenly recognized as a different word and overlooked.

Therefore, in the exemplary embodiment, since the content of the receiving call differs for respective telephone numbers for receiving, the voice recognition resource corresponding thereto is selected. Also, a common voice recognition resource may be prepared when there is no difference in sound qualities and used vocabularies of the calls among a plurality of telephone numbers for receiving. The background information assigned to each telephone numbers for receiving, and the items to be selected in correspondence thereto described above, are shown in a table of FIG. 2.

The voice recognizing device 17 and the voice recognition process selecting device 19 may have the function contents thereof programmed to be executed by a computer.

The recognition result output device 20 shown in FIG. 1 outputs the recognition result obtained by the voice recognition device 17 in a format suited to application and purpose. In this case, the time information and the like is output along with the recognition result so that a correspondence between the original calling voice signal and the recognition result can be made, as necessary.

Next, the processing operation of the exemplary embodiment will be described below with reference to the drawings. The voice recognizing method of the present invention will also be illustrated and described.

FIG. 3 is a flowchart showing the processing operation of the voice recognizing apparatus 1 according to the exemplary embodiment.

First, when a call from a customer is received at the call receiving unit 11 (call receiving step), the calling voice signal of the received call and the receiving telephone number of the call with which the relevant call is received are input by the calling voice signal input device 12 and the receiving telephone number input device 13 (FIG. 3: step S1, calling voice signal input step, receiving telephone number input step).

It is determined whether or not the pre-processing module assigned to the input receiving telephone number is present in the module storing unit for pre-processing 15 by the voice correction process selecting device 16 (FIG. 3: step S2, correction content information selecting step), and if the pre-processing module corresponding to the receiving telephone number is present, the relevant pre-processing module is applied to the calling voice signal and the voice correction processing is executed (FIG. 3: step S3, voice correction step). If the pre-processing module corresponding to the receiving telephone number is not present, the voice correction processing is not executed on the calling voice signal (FIG. 3: NO in step S2).

Thereafter, the voice recognition resource assigned to the input receiving telephone number is selected by the voice recognition process selecting device 19 from those stored in the recognition dictionary, model, parameter storing unit 18 (FIG. 3: step S4, recognition information selecting step), and the voice recognition process using the selected voice recognition resource is executed on the calling voice signal by the voice recognizing device 17 (FIG. 3: step S5, voice recognition process).

The recognition result obtained in the voice recognition device 17 is output by the recognition result output device 20 in a format suited to the purpose (FIG. 3: step S6). The time information etc. is output along with the recognition result so that a correspondence between the original calling voice signal and the recognition result can be made, as necessary.

As described above, the exemplary embodiment can be applied to the calling voices recognition which is used in automatic answering, sorting of calls, and creation of call logs executed in a call center etc. in which the calls placed to the plurality of telephone numbers, including extension numbers, are corrected at one location to be responded. Furthermore, since different telephone numbers are prepared corresponding to the content to be responded or calling region, the voice recognition process corresponding to the relevant telephone number can be performed on the calling voice when the caller makes a telephone call to the telephone number serving its purpose.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This applications is based upon and claims the benefit of priority from Japanese patent applications No. 2006-028688, filed on Feb. 6, 2006, the disclosure of which is incorporated herein in its entirety by reference.

BRIEF DESCRIPTION OF THE DRAWINGS

FIG. 2 is a table showing background information to be assigned for respective telephone numbers for receiving and items to be selected/adjusted in correspondence thereto according to the exemplary embodiment shown in FIG. 1; and FIG. 3 is a flowchart showing a processing operation of the exemplary embodiment shown in FIG. 1.

Figure 1:
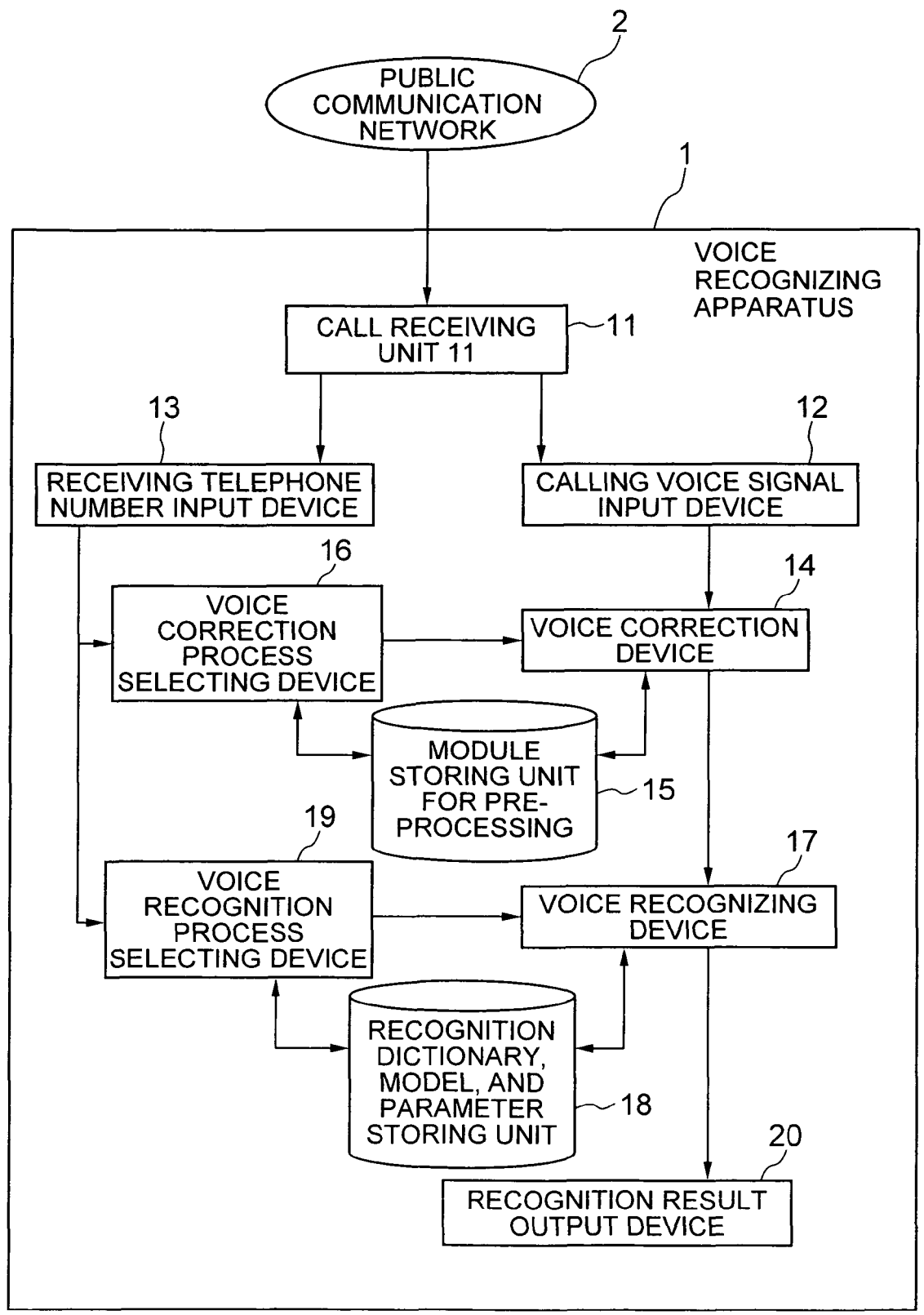
FIG. 1 is a block diagram showing a configuration of one exemplary embodiment of the invention.

DESCRIPTION OF SYMBOLS 1 voice recognizing apparatus
2 public communication network
11 call receiving unit 11
12 calling voice signal input device
13 receiving telephone number input device
14 voice correction device
15 module storing unit for pre-processing
16 voice correction process selecting device
17 voice recognizing device
18 recognition dictionary, model, and parameter storing unit
19 voice recognition process selecting device
20 recognition result output device

The invention claimed is:

1. A voice recognizing apparatus s for recognizing a calling voice from outside and specifying a voice content, comprising:
   a call receiving unit for receiving a call from a customer at a telephone number that the customer calls;
   a calling voice signal input device for inputting a calling voice signal of the call from the customer;
   a receiving telephone number input device for inputting the telephone number that the customer calls as a receiving telephone number of the call;
   a voice recognition information selecting device for selecting information corresponding to the receiving telephone number received by the receiving telephone number input device, the information being used for recognizing contents of voices different for respective receiving telephone numbers for receiving calls; and
   a voice recognition device for recognizing the calling voice associated with the receiving telephone number as language information by using the information to be used for voice recognition processing selected by the voice recognition information selecting device.

2. The voice recognizing apparatus according to claim 1, wherein the information to be used for the voice recognition processing is at least one of a recognition dictionary showing a correspondence of voice and vocabulary, an acoustic model representing acoustic features in minimum recognition unit of voice, a language model representing a connecting relationship of words, and information or recognition parameter indicating a procedure of voice recognition.

3. The voice recognizing apparatus according to claim 1, further comprising: a module storing unit for pre-processing for storing the information to beused for voice recognition processing in correspondence to a plurality of telephone numbers received by the receiving telephone number input device, wherein
   the correction content information selecting device selects the correction content information stored by the module storing unit for pre-processing according to the telephone number of the call received by the receiving telephone number input device, and
   the voice correction device reads out the correction content information selected by the correction content information selecting device from the module storing unit for pre-processing to perform the voice correction processing.

4. The voice recognizing apparatus according to claim 1, further comprising:
   a recognition dictionary, model, and parameter storing unit for storing the voice recognition information to be used for voice recognition processing in correspondence to the plurality of telephone numbers received by the receiving telephone number input device, wherein
   the voice recognition information selecting device selects the information to be used for voice recognition processing stored by the recognition dictionary, model, and parameter storing unit according to the telephone number of the call received by the receiving telephone number input device, and
   the voice recognition device reads out the information to be used for voice recognition processing selected by the voice recognition information selecting device from the recognition dictionary, model, and parameter storing unit to perform the voice recognition.

5. The voice recognizing apparatus according to claim 1, further comprising:
   a correction content information selecting device for selecting correction content information thr correcting the calling voice according to the receiving telephone number received by the receiving telephone number input device; and
   a voice correction device for performing voice correction processing as pre-processing of voice correction recognition according to the correction content information selected by the correction content information selecting device to output the calling voice to the voice recognizing unit.

6. A voice recognizing apparatus for recognizing a calling voice from outside and specifying a voice content, comprising:
   a call receiving means for receiving a call from a customer at a telephone number that the customer calls;

a calling voice signal input means tier inputting a calling voice signal of the call from the customer;

a receiving telephone number input means for inputtim the telephone number that customer calls as a receiving telephone number of the call;

a correction content information selecting means for selecting the correction content information for correcting the calling voice according to the receiving telephone number received by the receiving telephone number input means;

a voice correction means for performing voice correction processing as pre-processing of voice correction recognition according to the correction content information selected by the correction content information selecting means;

a voice recognition infbrmation selecting means for selecting information corresponding to the receiving telephone number received by the receiving telephone number input means, the information being used for recognizing contents of voices different for respective receiving telephone numbers for receiving calls; and a voice recognition means for recognizing the calling voice associated with the receiving telephone number as language information by using the information to be used for voice recognition processing selected by the voice recognition information selecting means.

7. A voice recognizing method for recognizing a calling voice from outside and specifying a voice content, comprising:

receiving a call from a customer at a telephone number that the customer calls;

inputting a calling voice signal of the call from the customer and receiving the telephone number that the customer calls as a receiving telephone number of the call; and selecting information corresponding to the receiving telephone number, the information being used for recognizing contents of voices different for respective receiving telephone numbers for receiving calls, and recognizing the calling voice associated with the receiving telephone number as language information by using the selected information to be used for voice recognition processing.

8. The voice recognizing method according to claim 7, wherein, as the information to be used for the voice recognition processing, at least one of a recognition dictionary showing a correspondence of voice and vocabulary, an acoustic model representing acoustic features in minimum recognition unit of voice, a language model representing a connecting relationship of words, and information or recognition parameter indicating a procedure of voice recognition is used.

9. The voice recognizing method according to claim 7, further comprising:

selecting the correction content information for correcting the calling voice according to the receiving telephone number; and performing voice correction processing as pre-processing of voice correction recognition according to the selected correction content information to output the calling voice.

10. A non-transitory computer readable recording medium storing a voice recognizing program for recognizing a calling voice from outside and specifying a voice content, for causing a computer to execute functions of:

receiving a call from a customer at a telephone number that the customer calls;

inputting a calling voice signal of the call from the customer and receiving a telephone number that the customer calls as a receiving telephone number of the call; and selecting information corresponding to the receiving telephone number, the information being used for recognizing contents of voices different for respective receiving telephone numbers for receiving calls, and recognizing the calling voice associated with the receiving telephone number as language information by using the selected information to be used for voice recognition processing.

11. The recording medium according to claim 10, wherein, as the infbrination to be used for the voice recognition processing, at least one of a recognition dictionary showing a correspondence of voice and vocabulary, an acoustic model representing acoustic features in minimum recognition unit of voice, a language model representing a connecting relationship of words, and information or recognition parameter indicating a procedure of voice recognition is used.

12. The non-transitory computer readable recording medium according to claim 10, further causing a computer to execute functions of:

selecting the correction content information for correcting the calling voice according to the receiving telephone number; and performing voice correction processing as pre-processing of voice correction recognition according to the selected correction content information to output the calling voice.

* * * * *